United States Patent [19]
Jones

[11] 3,815,935

[45] June 11, 1974

[54] OCCUPANT RESTRAINT SYSTEM

[75] Inventor: Trevor O. Jones, Birmingham, Mich.

[73] Assignee: General Motors Corporation, Detroit, Mich.

[22] Filed: Aug. 25, 1972

[21] Appl. No.: 283,825

[52] U.S. Cl.......... 280/150 AB, 137/39, 200/61.46, 200/61.58 R, 222/3
[51] Int. Cl.............................................. B60r 21/08
[58] Field of Search.......... 280/150 AB; 137/38, 39; 251/206; 222/3, 5; 200/61.46, 61.58 R

[56] References Cited
UNITED STATES PATENTS

| | | | |
|---|---|---|---|
| 1,527,927 | 2/1925 | Schroder | 251/206 |
| 2,510,356 | 6/1950 | Werts | 251/206 |
| 2,755,125 | 7/1956 | Hodges | 280/150 AB |
| 2,806,737 | 9/1957 | Maxwell | 137/38 |
| 2,834,606 | 5/1958 | Bertrand | 280/150 AB |
| 2,889,852 | 6/1959 | Dunlap | 251/206 |
| 3,684,309 | 8/1972 | Uchiyamada | 280/150 AB |
| 3,713,667 | 1/1973 | Blanchard | 280/150 AB |

Primary Examiner—David Schonberg
Assistant Examiner—John P. Silverstrim
Attorney, Agent, or Firm—Herbert Furman

[57] ABSTRACT

An occupant restraint system for a vehicle includes an inflator having an outlet sealed by a rupturable diaphragm and providing a source of pressure fluid. The diaphragm is ruptured by electrically fired detonators. A valve arrangement controlling communication of the outlet with an inflatable occupant restraint system includes a stationary outer cylindrical member and a rotatable inner cylindrical member. The inner and outer members have juxtaposed radial end walls. The wall of the outer member includes a circular opening while that of the inner member includes a generally teardrop shaped opening whose center line is generated about the axis of the members. Normally the openings are misaligned. A contact on the wall of the inner member and on the wall of the outer member provide a switch. Pendulous masses on the inner member function to rotate this member relative to the outer member to actuate the switch when the openings are moved to a position of alignment providing an orifice of at least a predetermined minimum area. The switch is included in the actuating circuit for the detonators.

5 Claims, 5 Drawing Figures

Fig. 1

PATENTED JUN 11 1974 3,815,935

OCCUPANT RESTRAINT SYSTEM

This invention relates generally to vehicle occupant restraint systems of the type having an inflator for actuating an inflatable occupant restraint cushion when the inflator is actuated by a control system and more particularly to such a restraint system having a valve arrangement controlling actuation of the sensor and the rate of flow of pressure fluid from the inflator to the cushion.

The valve arrangement in its preferred embodiment includes a pair of relatively rotatable coaxial members having openings which are movable to various aligned positions with respect to each other to provide a multiplicity of variable area orifices. The openings are provided in juxtaposed radial walls of the members and are normally misaligned to block communication of the inflator with the cushion. One opening is circular in shape and the other is teardrop in shape and generated about the axis of the members. Pendulous masses rotate the inner member relative to the outer member when impact of the vehicle with an obstacle generates an acceleration pulse of at least predetermined minimum amplitude and time. The rotation of the inner member moves the teardrop shaped opening to one of the various aligned positions with respect to the circular opening to provide an orifice controlling the rate of flow of pressure fluid from the inflator to the cushion. The area of the resultant orifice depends on the extent that the pulse strength exceeds the predetermined minimum. At a predetermined maximum pulse strength, the generally circular larger end of the teardrop shaped opening moves into alignment with the circular opening to provide a maximum flow rate.

The juxtaposed walls of the members further include switch contacts which cooperate with the members to provide a sensor. In one embodiment of the invention the contacts are normally open and close only when a predetermined arc of relative movement of the members has occurred so that at least a predetermined minimum area orifice communicates the inflator and the cushion. When the contacts close, the switch completes an electrical circuit across a source of power and the detonators to fire the detonators and thereby actuate the inflator. The actuation of the inflator is dependent upon the occurrence of the predetermined minimum area orifice since such an orifice must result before the switch closes. A conventional inertial type sensor may be included in series with the switch for redundancy. In another embodiment of the invention, the contacts are normally closed and the switches are in parallel with the detonators to short them out. The detonators are in series with redundant conventional inertial type sensors across a source of power and cannot be fired unless the switch opens. This again can only occur when a predetermined minimum area orifice occurs. Thus, again, actuation of the inflator is dependent upon the occurrence of at least a predetermined minimum area orifice.

The primary feature of this invention is that it provides an improved vehicle occupant restraint system having a valve arrangement which provides both a sensor controlling actuation of the inflator and a flow control orifice controlling communication of the inflator with the cushion. Another feature of this invention is that the area of the orifice varies with the strength of the pulse generated by impact of the vehicle with an obstacle, and that a predetermined minimum area orifice must occur before the inflator is actuated. A further feature of this invention is that the variable area orifice is provided by a pair of relatively rotatable inertia-responsive members, one having an opening which is generally circular in shape and the other having an opening which is generally teardrop in shape, the openings being movable to various positions of alignment in accordance with the strength of the acceleration pulse received by the members to provide a multiplicity of variable area orifices. Yet another feature of this invention is that the members include switch contacts which cooperatively provide a switch controlling actuation of the inflator upon the occurrence of at least a predetermined minimum area orifice.

These and other features of the invention will be readily apparent from the following specification and drawings wherein.

Figure 1:
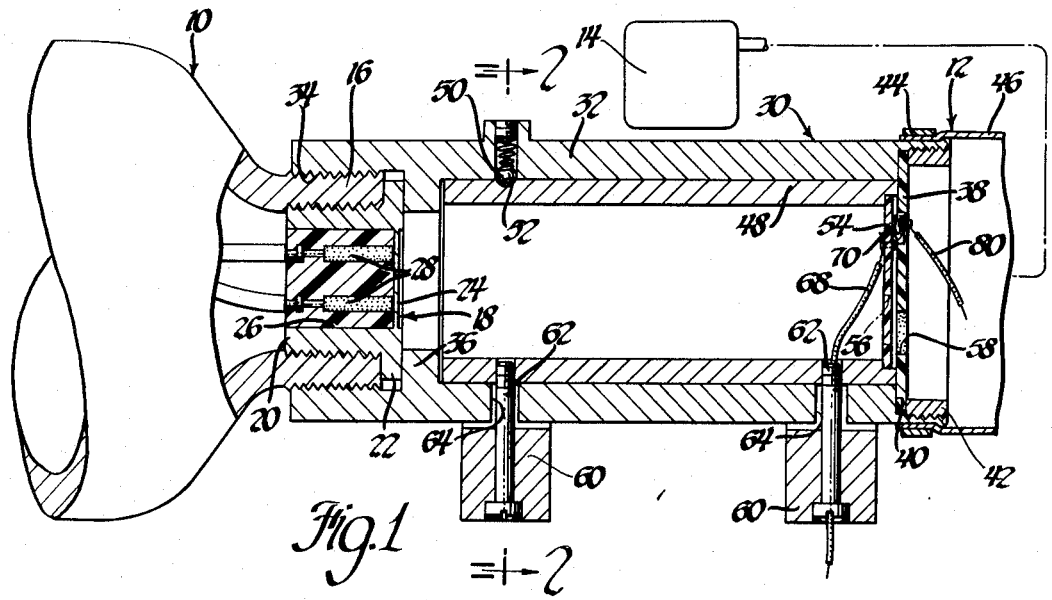
FIG. 1 is a sectional view of an occupant restraint system according to this invention.

Referring now particularly to FIG. 1 of the drawings, an occupant restraint system according to this invention includes an inflator 10 providing a source of pressure fluid and a manifold 12 communicating with the source and an inflatable occupant restraint cushion 14. The inflator 10 is shown as a pressure vessel although it could likewise be a gas generator or of the augmented type. The pressure vessel is conventional and the communication of the manifold 12 with the cushion 14 is likewise conventional. The details thereof are therefore not shown. Reference may be had to application Ser. No. 142,533 Noll et al., filed May 12, 1971, for these details.

The internally and externally threaded neck or outlet 16 of the pressure vessel has one end thereof sealed by what is commonly known as a plug 18. This plug includes a threaded body 20 which is threaded into the outlet 16 and an annular flange 22 which seats against the end wall of the outlet 16. An integral diaphragm 24 closes the bore 26 of the body which normally receives, as shown, a pair of electrically fired conventional detonators 28 seating against the diaphragm and located in place by conventional stemming compound. A valve arrangement designated generally 30 is included in the manifold assembly which communicates the outlet 16 of the pressure vessel with the cushion 14. This valve arrangement includes an outer tubular member 32 having an internally threaded one end 34 which receives the outlet 16 and the flange 22 of plug 18. The internal radial flange 36 of member 32 seats against the flange 22 to hold the flange in place against the end wall of the outlet 16. The member 32 further includes a radial end wall or plate 38 of dielectric material received within the counterbored other end of the member and seating against a flange 40. A bushing 42 holds plate 38 in place. A clamp ring 44 secures the other end of the member 32 to a tube 46 of the manifold assembly 12.

Figure 2:
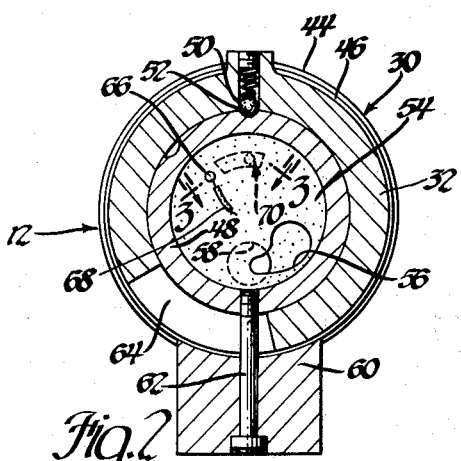
FIG. 2 is a sectional view taken generally along the plane indicated by line 2—2 of FIG. 1.

A second tubular member 48 is rotatably received within the member 32. A compression spring biased ball 50 mounted in a bore of member 32 seats in a depression 52 of member 48 to normally locate the member 48 as shown. The member 48 further includes a radial end wall or plate 54 of dielectric material which is suitably secured thereto and juxtaposed to plate 38. As best shown in FIG. 2 of the drawings, the plate 54 includes a generally teardrop shaped opening 56 having its centerline generated about the axes of members 32 and 48 and which may be variably aligned with a generally circular opening 58 of plate 38 to provide a multiplicity of variable area orifices, as will be further described, controlling communication of outlet 16, when diaphragm 24 is ruptured, with cushion 14. The center line of the opening 56 and the center of the opening 58 are of equal radii. The opening 56 is generated by the line of tangency of a number of circles of decreasing diameter, with the larger end of this opening being of the same diameter as the opening 58.

A pair of counterbored pendulous masses 60 are secured to the member 48 by means of bolts 62 which extend through partially circumferential slots 64 of member 32 as best shown in FIGS. 1 and 2 and are threaded to member 48.

Normally, the member 48 is located as shown in FIGS. 1 and 2, with the teardrop shaped opening 56 misaligned with respect to the circular opening 58.

Figure 3:
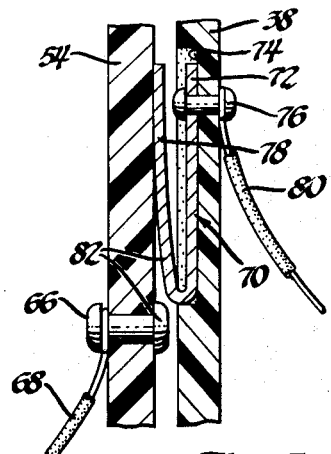
FIG. 3 is an enlarged sectional view taken generally along the plane indicated by line 3—3 of FIG. 2.

As shown in FIGS. 1 through 3, a contact 66 of the rivet type is secured to the plate 54 and a conductor 68 leads from this contact outwardly of the members 32 and 48 through a bore provided in one of the bolts 62. A leaf spring type contact 70 has one leg 72 thereof received in a recess 74 of plate 38 and secured to the base wall of this recess by a rivet 76. The other leg 78 of the contact 70 slidably engages the plate 54. A conductor 80 connects to the rivet 76 and extends outwardly of the tube 46. The contact 70 and recess 74 are arcuate in shape and generated about the axes of the members 32 and 48. The contacts 66 and 70 are equally radially spaced from the axis of the members. When the members 32 and 48 are in their position as shown and the openings 56 and 58 are misaligned as shown in FIG. 2, the contact 66 is spaced circumferentially of the leg 78 of contact 70 as shown in FIG. 3 so that the switch 82 provided by these contacts is in a normally open position.

When the members 32 and 48 have rotated through a predetermined arc of movement, it can be seen that the contact 66 will engage the leg 78 of contact 70 and close the switch. This arc of movement requires that the opening 56 move to a predetermined position with respect to the opening 58 so that at least a minimum area orifice will have occured. Upon continued movement of the opening 56 with respect to the opening 58 to provide an orifice of greater area, the switch remains closed.

Figure 4:
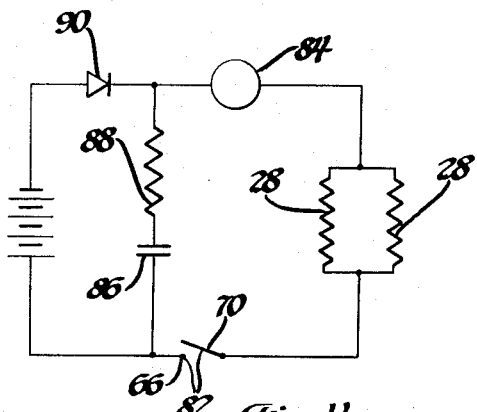
FIG. 4 is a circuit diagram.

With reference now to FIG. 4, the detonators 28 are shown as being connected across a battery by a sensor 84 and the switch 82. A condenser 86 is charged through a resistor 88 to provide an auxiliary power source and the condenser voltage is protected by a diode 90. The sensor 84 may be of any conventional inertia or velocity type, such as that shown in U.S. Pat. No. 3,619,524 Gillund, issued Nov. 9. 1971. Such sensors are actuated when the vehicle on which the sensor is mounted receives an acceleration pulse of predetermined minimum amplitude and time resulting from impact of the vehicle with an obstacle or experiences a predetermined minimum change in velocity in a predetermined time.

The inflator 10 will, of course, be mounted on the vehicle in a position to receive pulses in the same manner as the sensor 84. When a pulse of at least predetermined minimum amplitude and time is received by the inflator 10, the pendulous masses 60 will rotate the member 48 through at least a predetermined minimum arc of movement. This will move the opening 56 relative to the opening 60 and provide at least a minimum area orifice communicating the inflator 10 with the tube 46. The orifice area will, of course, depend upom the strength of the pulse, provided that the pulse is above the predetermined minimum. As the minimum area orifice is being provided by the rotation of member 48, the contact 66 will move into engagement with the leg 78 of contact 70 to close the switch 82. As can be seen from FIG. 4, closure of the switch 82 will electrically fire the detonators 28 to rupture the diaphragm 24 and thereby release the pressure fluid from the inflator 10 for flow to the cushion 14.

The minimum amplitude and time of the pulse required to rotate the member 48 within the member 30 will be the same as those required to actuate the sensor 84. The ball 50 will move out of the depression 52 upon movement of the member 48 and will ride along the outer surface of the member 48 to thereby maintain this member in whatever position it is rotated to by the pulse. This will also maintain the orifice provided by the openings 56 and 58 once this orifice has resulted.

From the foregoing description, it can be seen that the inflator 10 will not be actuated to inflate the cushion 14 unless the predetermined minimum area orifice has first occurred. Once this minimum area orifice has occurred, the inflator is actuated. The area of the final orifice may, of course, be greater than that of the minimum area orifice if the pulse strength is greater than the predetermined minimum. If a maximum strength pulse is received, then the larger end of the opening 56 will move into alignment with the opening 58 to provide an orifice of maximum flow area. Any position of the opening 56 with respect to the opening 58 which is intermediate the predetermined minimum area and the maximum flow area will, of course, result in an intermediate flow area orifice. Theoretically the flow area of the orifice is infinitely variable depending upon the position of the opening 56 with respect to the opening 58.

Figure 5:
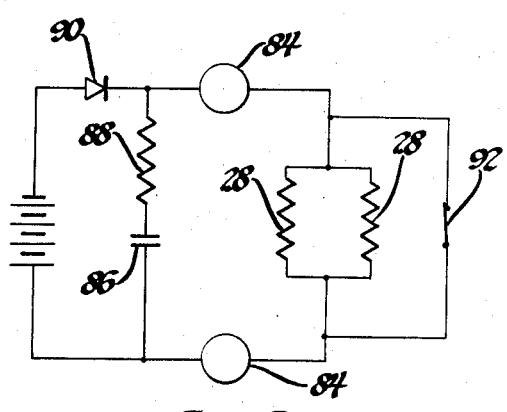
FIG. 5 is a circuit diagram.

FIG. 5 shows another embodiment of the invention which is similar in many respects to the first embodiment and, accordingly, like numerals have been used for like parts. In this embodiment, two of the sensors 84 are connected in series with the detonators 28. A switch 92 is connected in parallel with the detonators and is normally closed to short out the detonators. The switch 92 is basically the same as the switch 82 except that the contact 66 now normally engages the leg 78 of contact 72 so that the switch is normally closed. The contact 66 is arranged to move out of engagement with the leg 78 to open the switch when the member 48 has moved relative to the member 32 through an arc sufficient to establish the predetermined minimum flow area orifice defined by openings 56 and 58. Once the switch 92 opens, the sensors 84 can fire the detonators 28 to actuate the inflator 10 if the pulse received by the vehicle is sufficient to actuate the sensors.

In the embodiment of the invention shown in FIG. 4, the sensor 84 is included for reduncancy. Likewise in the embodiment shown in FIG. 5, the sensors 84 are included for the same purpose.

As previously mentioned, the inflator 10 may be a gas generator or of the augmented type. If the inflator is a gas generator, then the detonators 28 will be replaced by the igniter of the generator. If the inflator is of the augmented type, then the igniter thereof will be in series with the detonators.

Thus, this invention provides an improved occupant restraint system for a vehicle wherein the control system for the inflator includes a valve arrangement functioning both as a sensor and as a variable orifice controlling communication of the inflator with the occupant restraint cushion.

I claim:

1. An occupant restraint system for a vehicle comprising, in combination, an inflatable occupant restraint cushion, an inflator operable to provide pressure fluid for inflating the cushion, means for operating the inflator, means communicating the inflator with the cushion and including orifice means operable to provide a multiplicity of differently sized flow areas, each setting a rate of flow of pressure fluid from the inflator to the cushion, impact responsive means operating the orifice means to select one of the flow areas in accordance with the strength of a pulse generated by impact of the vehicle with an obstacle, and control means including means responsive to the operation of the orifice means by the impact responsive means for actuating the operating means for the inflator.

2. An occupant restraint system for a vehicle comprising, in combination, an inflatable occupant restraint cushion, an inflator operable to provide pressure fluid for inflating the cushion, means for operating the inflator, orifice means operable to provide a multiplicity of differently sized flow areas, each setting a rate of flow of pressure fluid from the inflator to the cushion, means operating the orifice means to select one of the flow areas and thereby set the rate of flow of pressure fluid from the inflator to the cushion, and means responsive to the operation of the orifice means for actuating the operating means for the inflator.

3. An occupant restraint system comprising, in combination, an inflatable occupant restraint cushion, and inflator operable to provide pressure fluid for inflating the cushion, means for operating the inflator, and a valve arrangement communicating the inflator with the cushion and including a pair of coaxial relatively rotatable members, each including an opening therein, the openings being varyingly alignable upon relative rotation of the members to provide a multiplicity of differently sized flow areas, means relatively rotating the members to select one of the flow areas in response to receipt by the members of an acceleration pulse of at least predetermined minimum amplitude and time, and means responsive to such selection for actuating the operating means for the inflator to thereby inflate the cushion, the flow rate of the pressure fluid from the valve arrangement being set by the selected flow area.

4. An occupant restraint system comprising, in combination, an inflatable occupant restraint cushion, an inflator operable to provide a source of pressure fluid for inflating the cushion, means for operating the inflator, and a valve arrangement communicating the inflator with the cushion and including a pair of coaxial relatively rotatable members, each including an opening therein, the openings being varyingly alignable upon relative rotation of the members to provide a multiplicity of differently sized flow areas, means for selecting one of the flow areas in accordance with the strength of an acceleration pulse received by the members, control circuit means for actuating the operating means for the inflator, and means included in the control circuit means and actuated upon relative rotation of the members for actuating the control means to actuate the operating means, the flow rate of the pressure fluid from the valve arrangement being set by the selected flow area.

5. An occupant restraint system comprising, in combination, an inflatable occupant restraint cushion, an inflator operable to provide pressure fluid for inflating the cushion, means for operating the inflator, and a valve arrangement communicating the inflator with the cushion and including a pair of coaxial relatively rotatable members, each including an opening therein, the openings being varyingly alignable upon relative rotation of the members to provide a multiplicity of differently sized flow areas, means rotating the members relative to each other in accordance with the strength of an acceleration pulse received by the members to select one of the flow areas, switch means actuated by relative rotation of the members and the selection of a flow area, and control circuit means including the switch means and the operating means and responsive to actuation of the switch means for actuating the operating means to operate the inflator, the flow rate of the pressure fluid from the valve arrangement being set by the selected flow area.

* * * * *